United States Patent
Danford (10) Patent No.: US 11,993,264 B2
(45) Date of Patent: May 28, 2024

(54) SYSTEMS AND METHODS FOR AUTONOMOUS VEHICLE CONTROL BASED UPON OBSERVED ACCELERATION

(71) Applicant: GM GLOBAL TECHNOLOGY OPERATIONS LLC, Detroit, MI (US)

(72) Inventor: Kevin Danford, San Francisco, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 511 days.

(21) Appl. No.: 16/216,405

(22) Filed: Dec. 11, 2018

(65) Prior Publication Data

US 2020/0180643 A1 Jun. 11, 2020

(51) Int. Cl.
*G01C 21/36* (2006.01)
*B60W 10/18* (2012.01)
(Continued)

(52) U.S. Cl.
CPC ...... *B60W 30/18172* (2013.01); *B60W 10/18* (2013.01); *B60W 10/20* (2013.01);
(Continued)

(58) Field of Classification Search
CPC .......... G05D 1/0088; G05D 1/0214; G05D 2201/0213; G05D 1/0278; G05D 1/0246; G05D 1/0223; G05D 1/0253; G05D 1/0257; G05D 1/0255; G05D 1/0212; G05D 2201/0212; G05D 1/0221; G05D 1/0027; G05D 1/0231; G05D 1/0248; G05D 1/024; G05D 1/021; G05D 1/0242; G05D 1/027; G05D 1/0293; G05D 1/00; G05D 1/0055;
(Continued)

(56) References Cited

U.S. PATENT DOCUMENTS 5,033,002 A 7/1991 Sol
6,138,496 A 10/2000 Allmann et al.
(Continued)

FOREIGN PATENT DOCUMENTS

DE 102010008208 A1 8/2011
DE 102013015028 A1 3/2015
(Continued)

OTHER PUBLICATIONS

"International Search Report for PCT Patent Application No. PCT/US2019/065603", dated Mar. 23, 2020, 5 Pages.
(Continued)

*Primary Examiner* — Jelani A Smith
*Assistant Examiner* — Paul A Castro (57) ABSTRACT

Described herein are various technologies that pertain to controlling an AV based upon forward-looking observations of road surface behavior. With more specificity, technologies described herein pertain to controlling maneuvering of an AV in a region of a driving environment based upon an observed acceleration of an object in that region of the driving environment. A plurality of positions of an object in the driving environment are determined from output of sensors mounted on the AV. An acceleration of the object is computed based upon the positions. The AV is subsequently controlled based upon the computed acceleration.

20 Claims, 7 Drawing Sheets

(51) Int. Cl.
*B60W 10/20* (2006.01)
*B60W 30/18* (2012.01)
*B60W 40/06* (2012.01)
*G01C 21/00* (2006.01)

(52) U.S. Cl.
CPC ......... *B60W 40/06* (2013.01); *G01C 21/3822* (2020.08); *G01C 21/3841* (2020.08); *G01C 21/3896* (2020.08); *B60W 2520/105* (2013.01)

(58) Field of Classification Search
CPC .. G05D 1/0291; G05D 1/0891; G05D 1/0272; G05D 1/0289; G08G 1/166; G08G 1/162; G08G 1/096725; G08G 1/096827; G08G 1/096844; G08G 1/167; G08G 1/16; G08G 1/22; G08G 7/02; G08G 1/163; G08G 5/04; G08G 1/161; G08G 1/005; G08G 1/096708; G08G 5/045; G08G 1/09675; B60W 50/14; B60W 30/09; B60W 10/18; B60W 2710/18; B60W 30/08; B60W 2554/80; B60W 30/0956; B60W 40/10; B60W 30/0953; B60W 2420/42; B60W 30/00; B60W 30/18154; B60W 30/143; B60W 40/06; B60W 2510/18; B60W 2554/4041; B60W 2552/30; B60W 40/076; B60W 2554/00; B60W 30/095; B60W 50/0097; B60W 2520/105; B60W 2720/106; B60W 30/16; B60W 2552/15; B60W 2556/00; B60W 60/00274; B60W 2520/26; B60W 2554/4029; B60W 10/184; B60W 2050/0014; B60W 2520/16; B60W 50/0098; B60W 60/0027; B60W 2520/20; B60W 2552/40; B60W 2554/4049; B60W 40/068; B60W 40/107; B60W 20/11; B60W 2554/40; B60W 30/18159; B60W 30/18172; B60W 40/064; B60W 40/101; B60W 40/109
See application file for complete search history.

(56) References Cited

U.S. PATENT DOCUMENTS

| | | | |
|---|---|---|---|
| 8,887,585 | B2 | 11/2014 | Furniss et al. |
| 2011/0276246 | A1* | 11/2011 | Kuze ................ B60W 10/06 701/96 |
| 2013/0229523 | A1 | 9/2013 | Higgins-Luthman et al. |
| 2016/0133131 | A1* | 5/2016 | Grimm ............ G08G 1/096725 701/117 |
| 2018/0244278 | A1 | 8/2018 | Shami et al. |
| 2019/0155289 | A1* | 5/2019 | McNeil ................ G05D 1/0214 |
| 2019/0301969 | A1* | 10/2019 | Morton ..................... G01P 5/16 |
| 2021/0163002 | A1* | 6/2021 | Kito .................... B60W 30/165 |

FOREIGN PATENT DOCUMENTS

| | | | |
|---|---|---|---|
| EP | 0227003 B1 | 7/1987 | |
| EP | 3360748 A1 | 8/2018 | |
| EP | 3880534 A1 | 6/2020 | |
| EP | 3880534 B1 | 10/2023 | |
| KR | 2014050992 A * | 4/2014 | ............. B60L 11/18 |
| WO | 2020123584 A1 | 6/2020 | |

OTHER PUBLICATIONS

"Written Opinion of the International Searching Authority for PCT Patent Application No. PCT/US2019/065603", dated Mar. 23, 2020, 6 Pages.
"International Preliminary Report on Patentability for PCT Patent Application No. PCT/US2019/065603", dated Jun. 8, 2021, 7 Pages.
"Response to the Office Action for European Patent Application No. 19832524.3", Filed Date: Dec. 24, 2021, 5 pages.
"Communication Under Rule 71(3) EPC for European Patent Application No. 19832524.3", dated May 9, 2023, 40 pages.

\* cited by examiner

SYSTEMS AND METHODS FOR AUTONOMOUS VEHICLE CONTROL BASED UPON OBSERVED ACCELERATION

BACKGROUND

An autonomous vehicle (AV) is a motorized vehicle that can operate without a human driver. An exemplary AV includes a plurality of sensor systems, such as but not limited to, a lidar sensor system, a camera sensor system, and a radar sensor system, amongst others. The AV operates based upon sensor signals output by the sensor systems.

In connection with performing various automated control functions (e.g., traction control, anti-lock braking, stability control, etc.), vehicles can include systems that output data indicative of traction between a road surface and a wheel of the vehicle. A traction control system of the vehicle can then be operated based upon such data in order to prevent slipping between the wheel and the road surface.

Conventional systems for measuring on-road traction of a vehicle use data from vehicle-mounted sensors (e.g., wheel speeds, steering angle, acceleration, etc.) to compute a value of traction between a vehicle wheel and a road surface beneath the wheel. These conventional approaches to on-road traction measurement only provide traction information relative to the traction of a road surface presently beneath the vehicle, or road surfaces previously traversed by the vehicle. These conventional systems are therefore unable to provide information pertaining to traction with respect to a road surface in a forward path of the vehicle.

Other conventional approaches rely on using sensor data to form indirect inferences about road surface traction. By way of example, in one conventional approach an estimate of road surface traction is generated based upon outside temperature. In another conventional example, an estimate of road surface traction is generated based upon a duty cycle of the windshield wipers of the vehicle. Such indirect conventional approaches produce inaccurate estimates of road traction (e.g., simply indicating "low", "medium", or "high" traction), and rely on rules of thumb that may not be accurate in all driving environments (e.g., a road surface offers less traction when it is cold outside).

SUMMARY

The following is a brief summary of subject matter that is described in greater detail herein. This summary is not intended to be limiting as to the scope of the claims.

Described herein are various technologies that pertain to controlling an AV based upon forward-looking observations of road surface behavior. With more specificity, technologies described herein pertain to controlling maneuvering of an AV in a region of a driving environment based upon an observed acceleration of an object in that region of the driving environment.

In an exemplary embodiment, an AV comprises a plurality of sensor systems, a steering system, a propulsion system, and a braking system. The AV further comprises a computing system that outputs data pertaining to objects in the driving environment based upon sensor signals received from the sensor systems. By way of example, the computing system can output data indicative of relative or absolute positions of objects in the driving environment, classifications of objects in the driving environment (e.g., as belonging to one of various object types such as vehicle, pedestrian, cyclist, etc.).

The computing system of the AV computes a magnitude of acceleration of an object in the driving environment over a period of time, where the object traverses a region in the driving environment over the period of time. A road surface on which the object is traveling necessarily offers sufficient traction to allow for the observed magnitude of acceleration of the object. The AV can therefore subsequently be controlled such that maneuvering of the AV is based upon the observed acceleration of the object in the region. In a non-limiting example, the computing system can control the AV such that the AV has a maximum acceleration that is less than or equal to the observed acceleration of the object when the AV is traversing the region in the driving environment. In another example, the computing system can control the AV such that, when entering the region, the AV has a speed low enough that the AV can be stopped within a desired stopping distance using an acceleration with a magnitude less than or equal to the observed acceleration of the object.

In further embodiments, the AV can be included in a fleet of AVs that are in communication with a central server computing device. When the AV computes a magnitude of acceleration of an object in a region of the driving environment, the AV can transmit surface data to the server computing device that is indicative of traction provided by a road surface in the region. By way of example, and not limitation, the AV can transmit data indicating an observed acceleration of an object in the region, an estimate of a coefficient of traction of the road surface in the region, etc. Subsequently, the server computing device can transmit the surface data to the other AVs in the fleet, and these other AVs can operate within the region based upon the surface data.

The traction detection approaches described herein present several advantages over conventional traction estimation systems. For instance, unlike traction sensors that measure a force of traction between a wheel of a vehicle and a road surface, the approaches described herein are suitable for generating estimates of road surface traction in a forward path of the vehicle on a surface the vehicle has not previously traversed. Furthermore, unlike systems that estimate traction of road surfaces that have not yet been traversed based on rules of thumb and indirect inference from environmental factors (e.g., temperature or precipitation as determined by windshield wiper duty cycle), the approaches described herein allow for accurate determination of at least minimum road surface traction for surfaces in a forward path of a vehicle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to controlling an AV based upon observed accelerations of objects in the driving environment are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Figure 1:
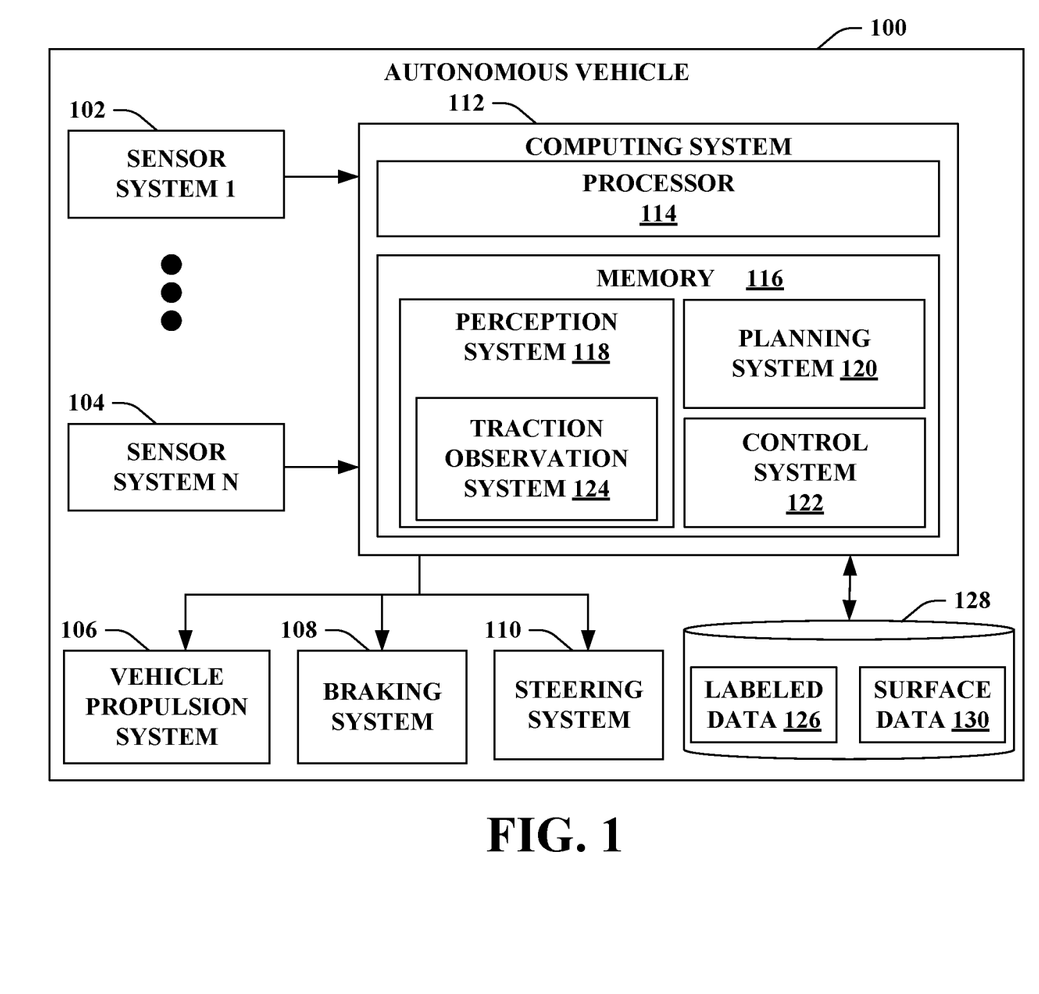
FIG. 1 illustrates a functional block diagram of an exemplary AV.

Referring now to the drawings, FIG. 1 illustrates an AV 100. The AV 100 can navigate about roadways without human conduction based upon sensor signals outputted by sensor systems of the AV 100. The AV 100 includes a plurality of sensor systems, namely, a sensor system 1 102, . . . , and a sensor system N 104, where N can be substantially any integer greater than 1 (collectively referred to herein as sensor systems 102-104). The sensor systems 102-104 are of different types and are arranged about the AV 100. For example, the sensor system 1 102 may be a lidar sensor system and the sensor system N 104 may be a camera sensor (image) system. Other exemplary sensor systems included in the sensor systems 102-104 can include radar sensor systems, GPS sensor systems, sonar sensor systems, infrared sensor systems, and the like.

The AV 100 further includes several mechanical systems that are used to effectuate appropriate motion of the AV 100. For instance, the mechanical systems can include, but are not limited to, a vehicle propulsion system 106, a braking system 108, and a steering system 110. The vehicle propulsion system 106 can be an electric motor, an internal combustion engine, or a combination thereof. The braking system 108 can include an engine brake, brake pads, actuators, and/or any other suitable componentry that is configured to assist in decelerating the AV 100. The steering system 110 includes suitable componentry that is configured to control the direction of movement of the AV 100.

The AV 100 additionally includes a computing system 112 that is in communication with the sensor systems 102-104, the vehicle propulsion system 106, the braking system 108, and the steering system 110. The computing system 112 includes a processor 114 and memory 116. The memory 116 includes computer-executable instructions that are executed by the processor 114. Pursuant to various examples, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 of the computing system 112 includes a perception system 118, a planning system 120, and a control system 122. The perception system 118 is generally configured to identify, track and classify objects (e.g., vehicles, pedestrians, cyclists, etc.) in a driving environment of the AV 100. The perception system 118 can further includes a traction observation system 124 that is configured to generate surface data indicative of traction of road surfaces about the vehicle 100 based upon positions of objects in the driving environment, as will be described in greater detail below.

The planning system 120 is generally configured to plan a route that the AV 100 is to follow in its driving environment. The planning system 120 can be configured to plan a destination route that indicates a high-level path to be traveled by the AV 100 in connection with reaching a particular destination. For instance, the planning system 120 can generate a destination route for the AV 100 in terms of turn-by-turn directions from a present location of the AV 100 to a destination (e.g., a location to which a passenger riding in the AV 100 desires to travel). The planning system 120 is further configured to plan a maneuvering route that indicates how the AV 100 is to traverse its immediate driving environment (e.g., an intersection through which the AV 100 is traveling). In exemplary embodiments, the planning system 120 is configured to generate a maneuvering route for the AV 100 based upon data output by the perception system 118 that pertains to objects in the driving environment of the AV 100. By way of example, the planning system 120 can generate the maneuvering route for the AV 100 for a prescribed time period (e.g., through the next 5 seconds, through the next 10 seconds, through the next 30 seconds) based upon positions of objects in the driving environment (e.g., as indicated in position solutions output by the perception system 118). In further embodiments, the planning system 120 can access labeled data 126 stored in a data store 128 on the AV 100 in connection with generating the maneuvering route for the AV 100. The labeled data 126 can include a labeled semantic map of the driving environment of the AV 100 that includes locations of streets, lanes of traffic, traffic signals and road signs, sidewalks, buildings, etc.

The control system 122 is configured to control at least one of the mechanical systems of the AV 100 (e.g., at least one of the vehicle propulsion system 106, the braking system 108, and/or the steering system 110). By way of example, the control system 122 can be configured to output control signals to any of the vehicle propulsion system 106, the braking system 108, or the steering system 110 to cause such systems 106-110 to direct the AV 100 along a trajectory generated by the planning system 120. Moreover, the control system 122 can be configured to provide data corresponding to the control of the mechanical system(s) to the planning system 120. For instance, the control system 122 can provide data to the planning system 120 specifying the state of the AV 100 (e.g., a speed of the AV 100, an orientation of wheels of the AV 100, current power output of the vehicle propulsion system 106, etc.) Thus, the planning system 120 can plan a route that the AV 100 is to follow based upon data corresponding to the control of the mechanical system(s) received from the control system 122.

Figure 2:
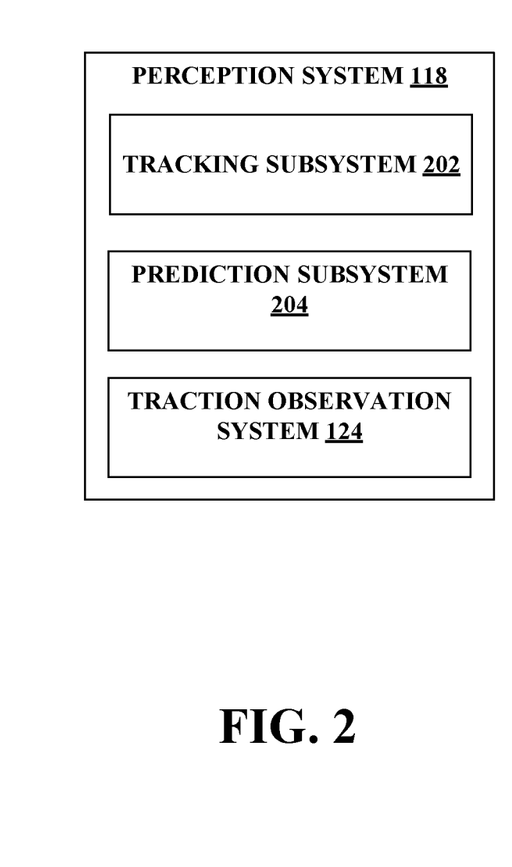
FIG. 2 illustrates a functional block diagram of an exemplary perception system of an AV.

Referring now to FIG. 2, a functional block diagram of the perception system 118 in various embodiments is illustrated. The perception system 118 includes a tracking subsystem 202 and a prediction subsystem 204. The tracking subsystem 202 is generally configured to identify the presence of objects in the driving environment of the AV 100 based upon sensor signals output by the sensor systems 102-104. The prediction subsystem 204 is configured to output data indicative of expected or potential future behavior of objects in the driving environment. For instance, the prediction subsystem 204 can be configured to output predictions of future positions of objects in the driving environment that are detected by the tracking subsystem 202. The perception system 118 further includes the traction observation system 124, which is configured to output data indicative of traction of road surfaces in the driving environment, as described in greater detail below.

The tracking subsystem 202 is further configured to classify identified objects in the driving environment according to one or more of several object types. In an exemplary embodiment, the tracking subsystem 202 is configured to classify identified objects in the driving environment as being motor vehicles, pedestrians, cyclists, motorcycles, trucks, or static objects (e.g., utility poles, garbage cans, or other objects in the driving environment that are expected to be stationary). It is to be appreciated that the tracking subsystem 202 can classify an object according to multiple object types. By way of example, an object classified generally as a vehicle can further be classified specifically as being a truck.

The tracking subsystem 202 is configured to track objects surrounding the autonomous vehicle 100. As such, the tracking subsystem 202 may be configured to interact with the plurality of sensor systems 102-104 in order to effectuate the tracking. In an example, when the plurality of sensor systems 102-104 include articulating (i.e., orientable) sensors, the tracking subsystem 202 may be configured to cause the articulating sensors to remain directed at objects in the driving environment of the autonomous vehicle 100 as the autonomous vehicle 100 is moving. In another example, the tracking subsystem 202 may be configured to control sensor systems in the plurality of sensor systems 102-104 such that objects remain tracked.

The tracking subsystem 202 is configured to generate a position solution for each of the identified objects in the driving environment of the AV 100 based upon sensor signals output by the sensor systems 102-104. For a given object, the position solution identifies a position of the object in space. In embodiments, the position solution indicates the position of the object in absolute terms (e.g., a latitude-longitude-altitude triple) or relative terms (e.g., a three-dimensional position of the object relative to the AV 100). In exemplary embodiments, a position solution can be determined based upon sensor data such as a lidar point cloud, radar- or sonar-based range data, vision data (e.g., as output by a camera), etc. In various embodiments, the tracking subsystem 202 is configured to periodically generate position solutions for objects in the driving environment. Thus, over a period of time, the tracking subsystem 202 generates a plurality of position solutions for each of a plurality of objects in the driving environment, where the position solutions are collectively indicative of a plurality of positions of the objects over a period of time.

As noted above, the traction observation system 124 is configured to output surface data that is indicative of traction available from a driving surface in the driving environment of the AV 100. Stated differently, the traction observation system 124 outputs an indication of an estimated magnitude of tractive force that can be applied by the wheels of the AV 100 to a driving surface in the driving environment without causing slipping between the wheels and the driving surface. The traction observation system 124 outputs the surface data based upon observed accelerations of objects in the driving environment of the AV 100. An estimate of tractive force or a coefficient of traction between a road surface and a tractive element of the object (e.g., a wheel of a vehicle such as a car, truck, or bicycle) can be computed based upon the observed accelerations. For instance, a minimum value of coefficient of traction or tractive force that can be provided by a driving surface can be computed by assuming that the driving surface must be able to provide at least an acceleration value that is equal to an observed acceleration value of an object that traverses the driving surface. It is to be appreciated that in some embodiments the traction observation system 124 can be configured to output the surface data based upon observed accelerations only of objects that use tractive force applied to the driving surface to provide locomotion, rather than accelerations of objects that may accelerate by other means (e.g., fan or jet propulsion).

Figure 4:
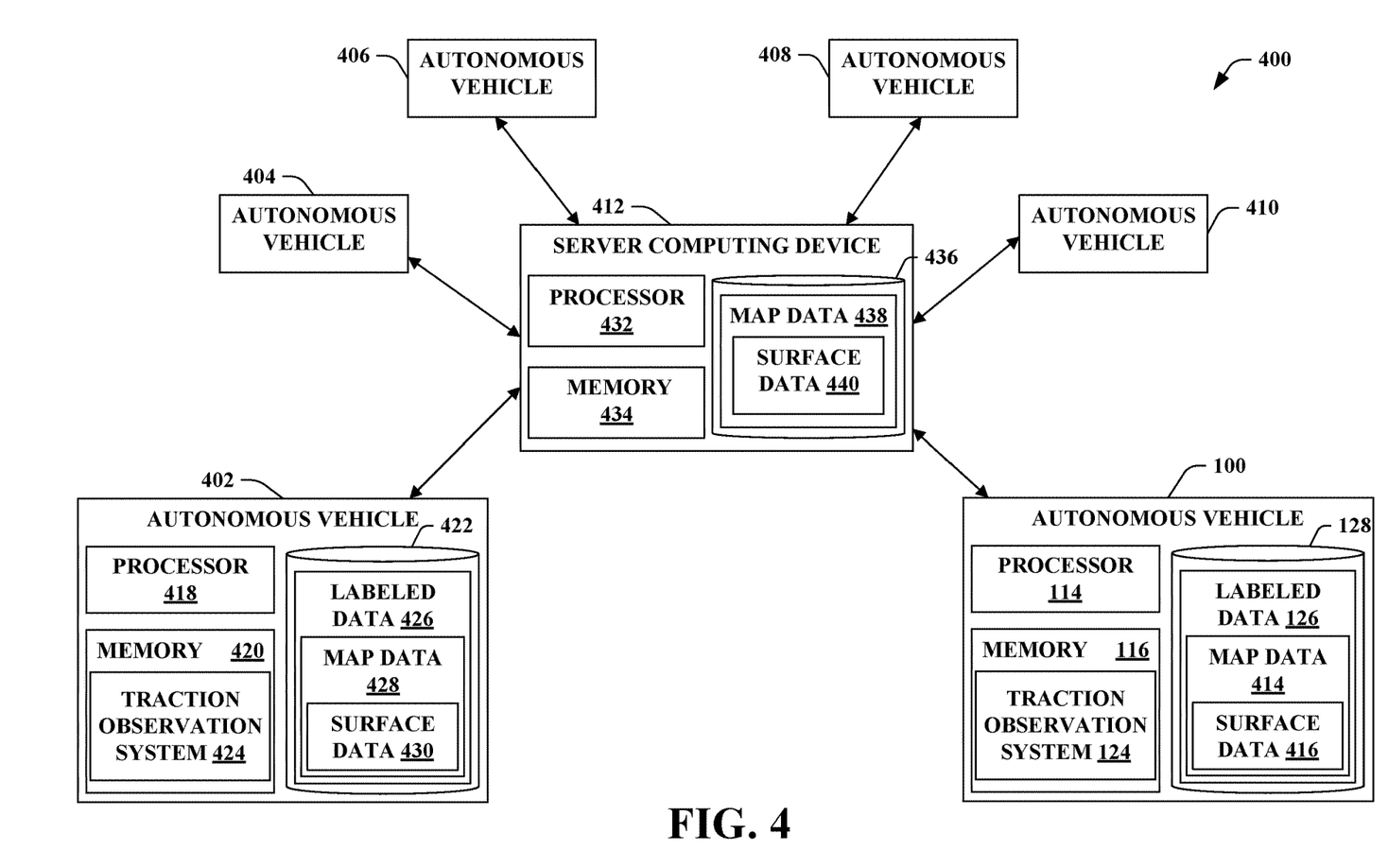
FIG. 4 illustrates an exemplary system for distributing surface data to a fleet of AVs.

In an exemplary embodiment, the traction observation system 124 receives data from the tracking subsystem 202 that is indicative of a plurality of positions of an object in the driving environment for a period of time. The data further includes time data associated with each of the positions, indicating a time at which the object was at the position. The traction observation system 124 computes an acceleration of the object based upon the positions of the object. By way of example, the traction observation system 124 can compute the acceleration from the positions and times indicated in the data received from the tracking subsystem 202 according to any of various conventional kinematics approaches to computing acceleration from position and time information, as will be appreciated by those of skill in the relevant art. The acceleration of the object computed by the traction observation system 124 can include a magnitude and direction of an acceleration vector in a three-dimensional space about the AV 100. In other embodiments, the acceleration computed by the traction observation system 124 can include a magnitude and direction of an acceleration vector in a two-dimensional space about the AV 100, where the two-dimensional space is a coordinate plane that includes a velocity vector of the AV 100. For example, the two-dimensional space can be a space seen in a top-down view of the AV 100 (e.g., as depicted in FIG. 4).

Subsequent to computing the acceleration (e.g., magnitude and/or direction of the acceleration) of the object in the driving environment, the traction observation system 124 can output surface data to either or both of the planning system 120 and the control system 122. The planning system 120 and the control system 122 can then, based on the surface data, plan maneuvers of the AV 100 or control operation of systems 106-110 of the AV 100, respectively. In further embodiments, the traction observation system 124 can store the surface data in the data store 128 as surface data 130. The planning system 120 and/or the control system 122 can subsequently access the surface data 130 in connection with planning routes or controlling operations of vehicle systems 106-110, respectively.

The surface data output by the traction observation system 124 comprises data that is indicative of an approximate tractive force that can be applied to a driving surface in the driving environment by a wheel of the AV 100. In a non-limiting example, the surface data can be or include a value of an acceleration of an object in the driving environment while the object traversed a region that includes the driving surface. In such example, the surface data can further include an object type classification of the object (e.g., as output by the perception system 118).

In another example, the surface data can be or include an estimated value of a minimum coefficient of traction between the driving surface and a wheel of the AV 100. In still another example, the surface data can be or include an estimated value of a potential tractive force that can be applied to the driving surface by a wheel of the AV 100 prior to slippage occurring between the wheel and the driving surface. The traction observation system 124 can be configured to compute the estimated values of the minimum coefficient of traction or the potential tractive force based upon the acceleration of the object computed by the traction observation system 124.

The traction observation system 124 can further be configured to compute the estimated values of the minimum coefficient of traction or the potential tractive force of the driving surface with respect to a wheel of the AV 100 based upon additional data that is available to the AV 100. In some embodiments, the traction observation system 124 can compute the estimated values of the minimum coefficient of traction or potential tractive force based upon data derived from output of the sensor systems 102-104. In a non-limiting example, the traction observation system 124 can be configured to compute the estimated values of the minimum coefficient of traction or the tractive forced based further upon an object type classification (e.g., vehicle, truck, bicycle, pedestrian, etc.) that is determined by the perception system 118 based upon output of the sensor systems 102-104. In further embodiments, the traction observation system 124 can compute the estimated values of the minimum coefficient of traction or potential tractive force based upon data included in the labeled data 126. In a further non-limiting example, the traction observation system 124 can compute the estimated values of the minimum coefficient of traction or potential tractive force based upon road surface data included in a labeled map of the driving environment that is included in the labeled data 126. By way of example, the road surface data can include a grade of the driving surface in the region of the computed acceleration of the object or a road surface material of the driving surface in the region (e.g., asphalt, concrete, gravel, dirt, etc.). The traction observation system 124 can further be configured to compute the potential tractive force of a driving surface based upon an approximate weight of the AV 100.

It is to be understood that the traction observation system 124 can compute different estimated values of the minimum coefficient of traction or potential tractive force of a driving surface based upon a same respective computed acceleration for two different objects in the driving environment. By way of example, the traction observation system 124 can identify that both a cyclist and a car accelerated at a rate of 1 m/s^2 through a particular region in the driving environment of the AV 100. In the example, the traction observation system 124 can compute a first estimated value of the minimum coefficient of traction of the driving surface in the region based upon the cyclist being observed to accelerate through the region at 1 m/s^2. The traction observation system 124 can further compute a second estimated value of the minimum coefficient of traction based upon the car being observed to accelerate through the region at 1 m/s^2, where the second estimated value is different from the first estimated value. The difference in the estimated values can result from different assumptions employed by the traction observation system 124 in connection with computing the minimum coefficients of traction based on the observed accelerations. For instance, the traction observation system 124 can compute the minimum coefficient of traction from acceleration of a cyclist based on a first set of assumptions (e.g., approximate cyclist weight, traction of a bicycle tire), and the minimum coefficient of traction from acceleration of a car based on a second set of assumptions (e.g., approximate car weight, traction of a car tire).

From the foregoing it is to be appreciated that the surface data can include observational data pertaining to objects in the driving environment (e.g., a computed acceleration of an object) and/or inferential data that is derived based in part upon observational data pertaining to objects in the driving environment (e.g., a minimum coefficient of traction or available tractive force between a wheel of the AV 100 and the driving surface).

The planning system 120 can plan destination routes and maneuvering routes for the AV 100 based upon the surface data received from the traction observation system 124. In exemplary embodiments, the planning system 120 can plan maneuvering routes for the AV 100 by using an observed acceleration of an object (e.g., as indicated in surface data received from the traction observation system 124) as a maximum allowable acceleration of the AV 100. In other examples, the planning system 120 can plan a maneuvering route for the AV 100 based upon an assumption that a driving surface can support an acceleration of the AV 100 that is at least as great as the observed acceleration of an object. For instance, in connection with planning a braking maneuver, the planning system 120 can identify a minimum stopping distance of the AV 100 based upon the driving surface being able to support an acceleration (e.g., opposite the direction of travel of the AV 100) that has a magnitude that is at least as great as the magnitude of the acceleration computed by the traction observation system 124.

In still other embodiments, the planning system 120 can be configured to determine whether the observed acceleration is anomalous relative to an expected acceleration value or range of expected values for objects in the same region of the driving environment. In an example, the perception system 118 can output an expected value of acceleration of objects in the driving environment. The expected value(s) can be based upon data about the driving environment including traffic information (e.g., proximity of vehicles to one another in the driving environment), traffic signal and lane information (e.g., locations of objects relative to traffic signals, intersections, lane boundaries, etc. in the driving environment). The planning system 120 can be configured to plan a maneuver of the AV 100 based upon an observed acceleration value of an object (e.g., as output by the traction observation system 124) being anomalous relative to expected values.

In an illustrative example, the planning system 120 can plan a stopping maneuver for the AV 100 when the AV 100 is approaching a stop sign. If a vehicle in front of the AV 100 is observed to decelerate more slowly than would be required for the vehicle to stop at the stop sign, it may be that the driving surface under the vehicle is unable to support a higher acceleration. The planning system 120 can plan a maneuver that causes the AV 100 to begin braking at a distance sufficient to stop the AV 100 taking the observed acceleration of the vehicle in front of the AV 100 as a maximum acceleration.

It is to be understood that in many ordinary operating circumstances, objects in a driving environment of the AV 100 will exhibit near-zero acceleration. For instance, objects traveling in a straight path with a constant speed along a roadway may have no cause to accelerate in any direction. The planning system 120 of the AV 100 can be configured to distinguish between ordinary operating circumstances where near-zero acceleration is expected and where near-zero acceleration is anomalous. By way of example, the planning system 120 can determine that a near-zero acceleration of an object is anomalous when the object is approaching a yellow traffic signal, but not anomalous when the object is already stopped in front of a red traffic signal or moving through an intersection subject to a green traffic signal.

Figure 3:
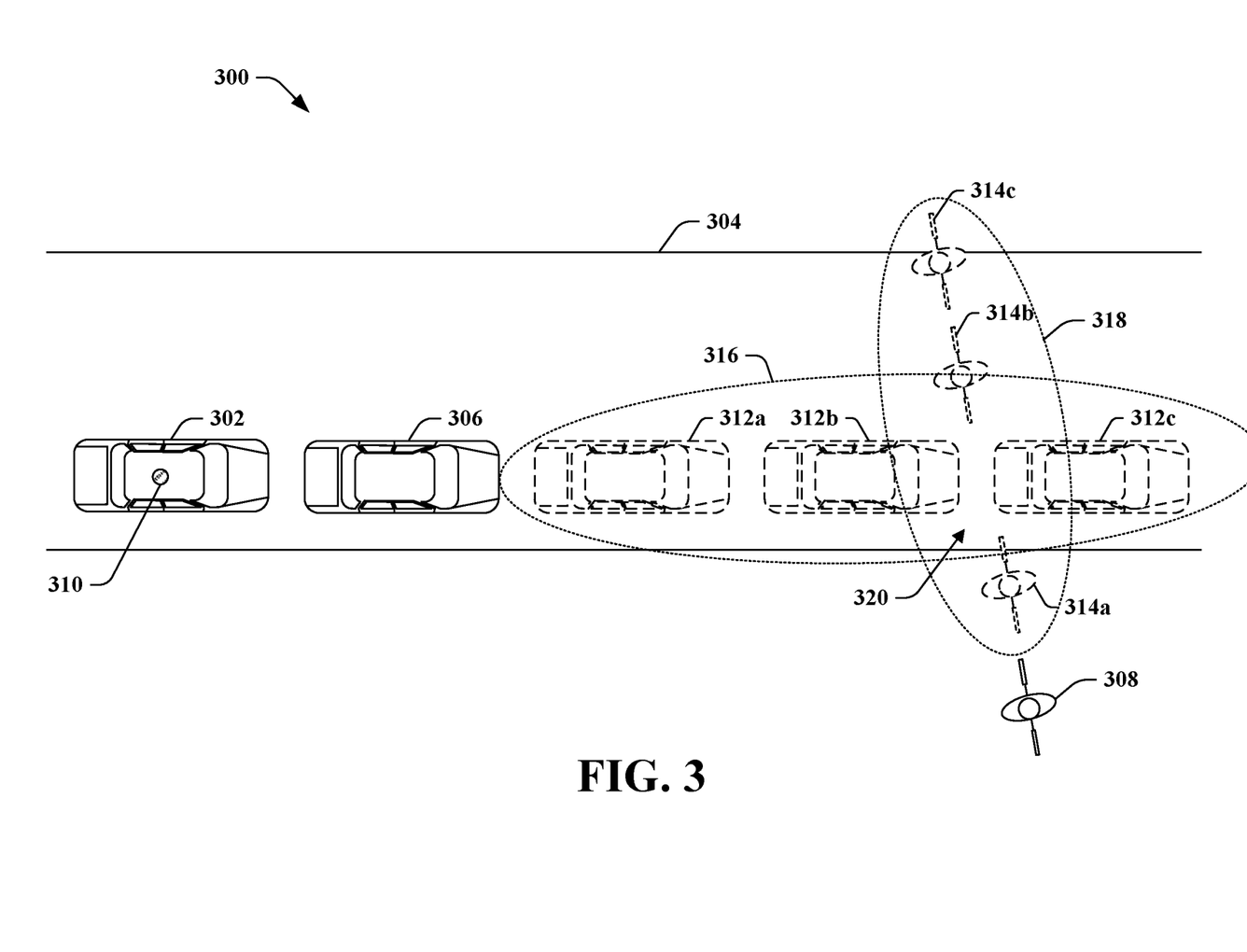
FIG. 3 illustrates an exemplary driving environment of an AV and positions of objects in the driving environment over time.

Various illustrative aspects are now described with respect to an example driving environment 300, depicted in FIG. 3. The exemplary driving environment 300 includes an AV 302 that traverses a roadway 304, a second vehicle 306 that also traverses the roadway 304, and a cyclist 308. The AV 302 includes a sensor system 310 that comprises one or more sensors that output data indicative of positions of objects in the driving environment 300. The AV 302 can be equipped with a computing device that includes a traction observation system, as in the AV 100. FIG. 3 further depicts a plurality of positions 312a-312c of the vehicle 306 over a period of time, and a plurality of positions 314a-314c of the cyclist 308 over the period of time. The AV 302 can generate, based upon sensor signals from the sensor system 310, position solutions of the vehicle 306 and the cyclist 308 that are indicative of the positions 312a-312c and 314a-314c. Based upon the position solutions, a traction observation system of the AV 302 can compute an acceleration of the vehicle 306 in a region 316 over the period of time. The traction observation system of the AV 302 can further compute an acceleration of the cyclist in a region 318 over the period of time. Subsequently, when traversing the region 316 operation of the AV 302 is controlled based upon the computed acceleration of the vehicle 306. Similarly, when traversing the region 318 operation of the AV 302 can be controlled based upon the computed acceleration of the cyclist 318. In a region 320 through which both the vehicle 306 and the cyclist 308 pass during the period of time, the AV 302 can be controlled based upon either or both of the computed acceleration of the vehicle 306 and the computed acceleration of the cyclist 308.

In various embodiments, the traction observation system 124 can be configured to repeatedly compute an acceleration of each of the objects in the driving environment as updated position information is received from the prediction subsystem 202. By way of example, the traction observation system 124 can output first surface data pertaining to a driving surface in a region in the driving environment based upon a computed acceleration of a first object as the first object traverses the region at a first time. Subsequently, the traction observation system 124 can output second surface data pertaining to the driving surface based upon a computed acceleration of a second object as the second object traverses the region at a second time. The traction observation system 124 can therefore be configured to continually update surface data pertaining to a driving surface in a region of the driving environment based upon subsequent observed accelerations of objects traversing the region.

Further, the traction observation system 124 can output data pertaining to a plurality of different regions in the driving environment as new observations of accelerations of objects in the driving environment are made. In an example, the traction observation system 124 can output surface data pertaining to a driving surface in a first region based upon a computed acceleration of a first object as the first object traverses the first region. The traction observation system 124 can output surface data pertaining to a driving surface in a second region based upon a computed acceleration of a second object as the second object traverses the second region. Hence, the traction observation system 124 can output surface data pertaining to driving surfaces of many regions in the driving environment at once, based upon observations of accelerations of objects as the objects traverse such regions.

The AV 100 can be included in a fleet of AVs that collectively share surface data pertaining to driving surfaces in an operational region of the AVs (e.g., a city, county, or other geographic region in which many AVs are operating). Referring now to FIG. 4, an exemplary system 400 that facilitates sharing of surface data among a fleet of AVs that includes the AV 100 and a plurality of additional AVs 402-410 is illustrated. The system 400 includes the AVs 100, 402-410, and a server computing device 412 that is in communication with each of the AVs 100, 402-410. The AV 100 includes the data store 128 that stores the labeled data 126. Included in the labeled data 126 are map data 414 that are representative of various features of the operational region of the AVs 100, 402-410. For instance, the map data 414 can include data pertaining to lane boundaries, traffic signs and signals, road hazards, construction zones, speed limits, etc. The map data 414 can further include surface data 416 that is indicative of traction of driving surfaces in the operational region. In various embodiments, the surface data 416 can further be indicative of other information relative to driving surfaces in the operational region such as material composition or road grade.

As shown in FIG. 4, the AV 402 includes a processor 418, memory 420 that stores instructions that are executed by the processor 418, and a data store 422. The memory 420 includes a traction observation system 424. The traction observation system 424, similar to the traction observation system 124, outputs surface data indicative of a measure of traction of a driving surface in the driving environment of the AV 402. The traction observation system 424 outputs the surface data based upon position solutions derived from sensor signals output by sensors (not shown) that are mounted on the AV 402. The data store 422 includes labeled data 426 that includes map data 428, which map data 428 can include surface data 430.

The server computing device 412 includes a processor 432, memory 434 that stores instructions that are executed by the processor 432, and a data store 436. The data store 436 includes map data 438, which map data 438 includes surface data 440.

In operation, the system 400 enables the AVs 100, 402-410 to share surface data pertaining to surfaces in the operational region of the AVs 100, 402-410 so that the AVs 100, 402-410 can be controlled based upon up-to-date information about driving surfaces in the operational region. The AVs 100, 402-410 are in communication with the server computing device 412 by way of respective network connections. For instance, the AVs 100, 402-410 can include respective transceivers (not shown) that are configured to communicate with the server computing device 412 by way of a wireless network (e.g., a cellular data network). Prior to deployment in the operational region, the AVs 100, 402 can be loaded with identical map data 414, 428 that is an up-to-date version of the map data 438. During operation of the AVs 100, 402 in the operational region, the traction observation system 124 can generate updated surface data pertaining to one or more regions in the driving environment of the AV 100 (e.g., as described in greater detail above with respect to FIGS. 1 and 2). The surface data generated by the traction observation system 124 is indicative of a measure of traction of a driving surface in the driving environment of the AV 100. This surface data may be more up to date than the surface data 416 initially loaded on the AV 100. The AV 100 can be configured to transmit the surface data generated by the traction observation system 124 to the server computing device 412. Responsive to receiving the surface data from the AV 100, the server computing device 412 updates the surface data 440 in the map data 438 to include the surface data received from the AV 100. The server computing device 412 then transmits the updated map data 438 (including the updated surface data 440) to the AV 402, whereupon the AV 402 updates the map data 428 and surface data 430 stored in the data store 422. Subsequently, the AV 402 can be controlled based upon the updated surface data 430. For instance, the AV 402 can be controlled based upon the surface data generated by the traction observation system 124 when the AV 402 is operating in a region to which that surface data pertains.

The system 400 can facilitate operation of a fleet of AVs by providing the fleet with surface data information that can be used by the AVs to plan faster and safer routes through the operational region of the fleet. For example, a first AV in the fleet can output surface data to the server that indicates that an intersection in the operational region has low observed accelerations relative to other portions of the operational region. The server can transmit updated map data that includes the surface data received from the first AV to the fleet of AVs. The AVs in the fleet can then plan destination or maneuvering routes in order to avoid the intersection, which may have low observed accelerations due to slippery roads or other dangerous road conditions.

The various technologies described herein present several advantages over other approaches to determining traction available from driving surfaces in a driving environment of the AV 100. For example, the traction observation system 124 can output data indicative of traction of driving surfaces that are in a forward path of the vehicle, unlike measurement systems that only measure traction between the wheels of the AV 100 and the driving surface beneath the wheels. Furthermore, the traction observation system 124 generates estimates of driving surface traction based upon observed ground truth about driving surface performance. For instance, a system based on visual analysis of a driving surface may make assumptions about a driving surface based on how the surface looks rather than how objects actually behave on the surface. Contrary to such approaches, the traction observation system 124 can determine a minimum tractive force required to be provided by a driving surface to result in observed accelerations of objects in the driving environment. The traction observation system 124 can therefore establish a lower bound of a coefficient of traction or potential tractive force of the driving surface that necessarily exists based on the observed acceleration.

Figure 5:
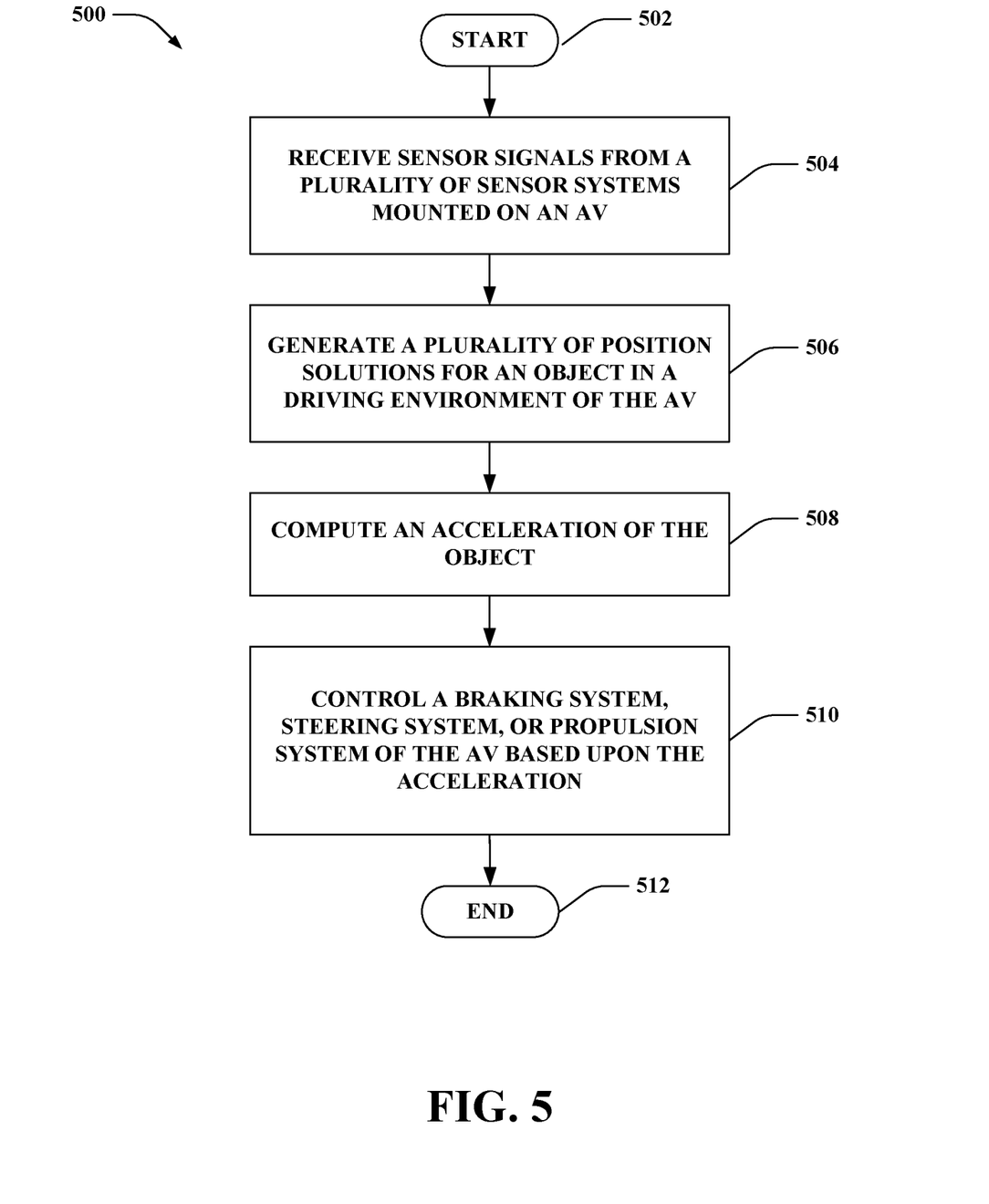
FIG. 5 is a flow diagram that illustrates an exemplary methodology for controlling an AV based upon observed accelerations of objects in a driving environment of the AV.
Figure 6:
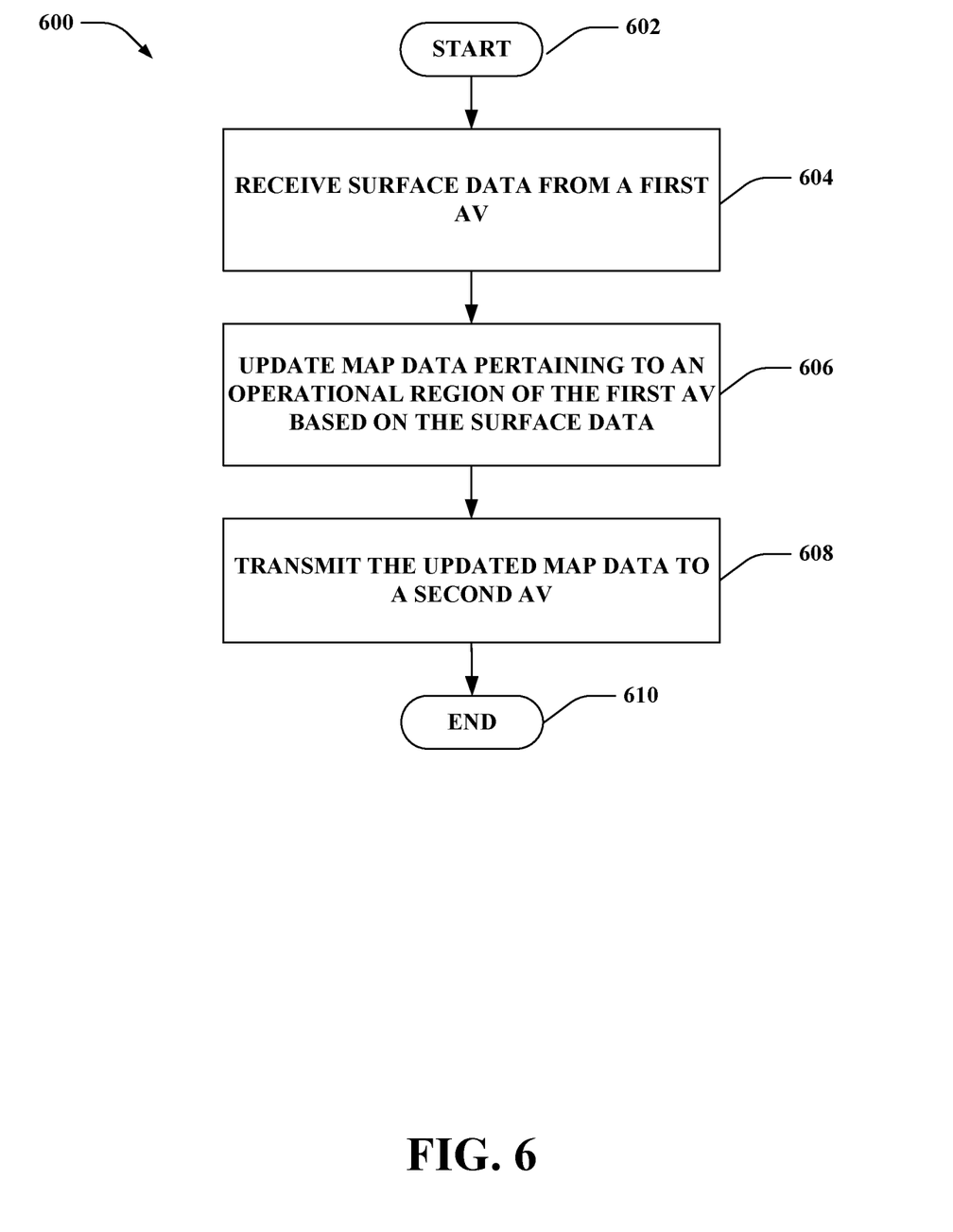
FIG. 6 is a flow diagram that illustrates an exemplary methodology for distributing surface data to a fleet of AVs.

FIGS. 5 and 6 illustrate exemplary methodologies relating to controlling an AV based upon observed accelerations of other objects in a driving environment of the AV. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference to FIG. 5, an exemplary methodology 500 performed in connection with controlling an AV based upon observed accelerations of objects in a driving environment of the AV is illustrated. The methodology 500 begins at 502 and at 504 sensor signals are received from a plurality of sensor system mounted on an AV. At 506, a plurality of position solutions are generated based upon the sensor signals, the position solutions being indicative of a plurality of positions of an object in the driving environment of the AV over a period of time. An acceleration of the object over the period of time is computed at 508. At least one of a braking system, a steering system, or a propulsion system of the AV is controlled based upon the computed acceleration at 510, whereupon the methodology 500 completes at 512.

With reference now to FIG. 6, an exemplary methodology 600 for distributing up-to-date surface data to a fleet of AVs is illustrated. The methodology 600 begins at 602 and at 604 surface data is received by a server computing device that is in communication with a fleet of AVs from a first AV in the fleet of AVs. The surface data is indicative of a measure of traction (e.g., a coefficient of traction or a value of potential tractive force) of a driving surface in a region of the driving environment of the first AV. At 606, the server computing device updates map data pertaining to an operational region of the fleet of AVs based on the surface data. By way of example, the map data is updated to indicate the measure of traction with respect to the region indicated in the surface data. At 608, the updated map data is transmitted to a second AV in the fleet of AVs, whereupon the methodology 600 ends 610.

Figure 7:
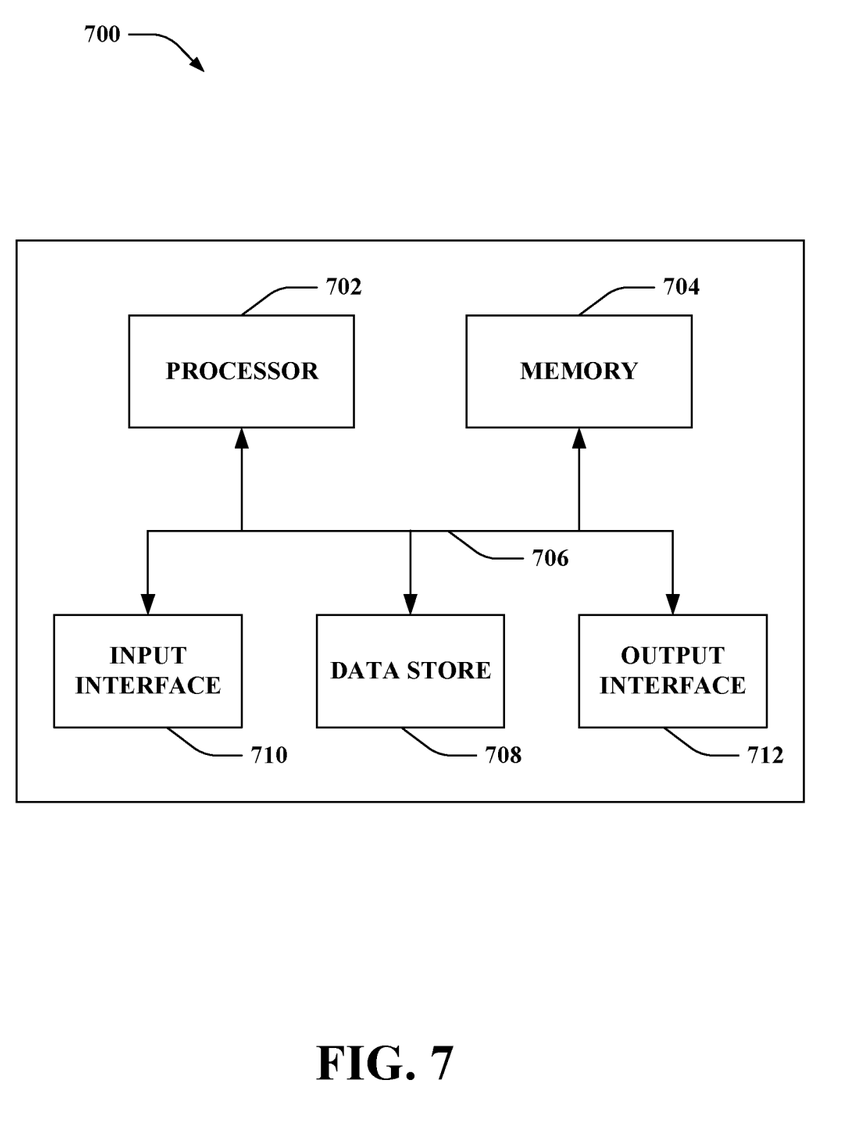
FIG. 7 illustrates an exemplary computing device.

Referring now to FIG. 7, a high-level illustration of an exemplary computing device 700 that can be used in accordance with the systems and methodologies disclosed herein is illustrated. For instance, the computing device 700 may be or include either of the computing systems 112, 412. The computing device 700 includes at least one processor 702 that executes instructions that are stored in a memory 704. The instructions may be, for instance, instructions for implementing functionality described as being carried out by one or more systems discussed above or instructions for implementing one or more of the methods described above. The processor 702 may be a GPU, a plurality of GPUs, a CPU, a plurality of CPUs, a multi-core processor, etc. The processor 702 may access the memory 704 by way of a system bus 706. In addition to storing executable instructions, the memory 704 may also store data pertaining to objects in a driving environment of an autonomous vehicle such as computed accelerations of objects in a driving environment of an autonomous vehicle, surface data, and so forth.

The computing device 700 additionally includes a data store 708 that is accessible by the processor 702 by way of the system bus 706. The data store 708 may include executable instructions, data pertaining to a driving environment of an autonomous vehicle, computer-implemented machine learning models, map data, surface data, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to the vehicle propulsion system 106, the braking system 108, and/or the steering system 110 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle (AV), comprising:
a plurality of sensor systems that generate a plurality of sensor signals, the plurality of sensor signals indicative of a different vehicle in a driving environment of the AV, the different vehicle being separate from the AV in the driving environment of the AV; and
a computing system that is in communication with the plurality of sensor systems, wherein the computing system comprises:
a processor; and
memory that stores computer-executable instructions that, when executed by the processor, cause the processor to perform acts comprising:
generating, based upon the sensor signals, a plurality of position solutions for the different vehicle in the driving environment, the position solutions indicative of positions of the different vehicle over a period of time, the positions being included in a region in the driving environment in a forward path of the AV;
computing a magnitude of acceleration of the different vehicle observed by the AV in the forward path of the AV within the region in the driving environment during the period of time based upon the position solutions;
computing a coefficient of traction of a driving surface in the region based upon the computed magnitude of acceleration of the different vehicle observed by the AV in the forward path of the AV within the region, an object type classification of the different vehicle, and an approximate weight of the different vehicle corresponding to the object type classification of the different vehicle; and
controlling acceleration of the AV while the AV traverses the region based upon the computed coefficient of traction of the driving surface in the region computed based upon the computed magnitude of acceleration of the different vehicle observed by the AV in the forward path of the AV within the region.

2. The AV of claim 1, wherein controlling the acceleration of the AV comprises controlling the acceleration of the AV based upon a maximum allowable acceleration value, the maximum allowable acceleration value based upon the computed magnitude of the acceleration of the different vehicle observed by the AV in the forward path of the AV within the region.

3. The AV of claim 1, wherein the object type classification indicates that an object detected in the driving environment based on the plurality of sensor signals is the different vehicle.

4. The AV of claim 1, wherein computing the coefficient of traction of the driving surface in the region is further based upon labeled data pertaining to the driving surface in the region.

5. The AV of claim 4, wherein the labeled data is indicative of a grade of the driving surface in the region.

6. The AV of claim 4, wherein the labeled data is indicative of a surface material of the driving surface in the region.

7. The AV of claim 1, wherein controlling the acceleration of the AV further comprises:
computing a potential tractive force of a driving surface in the region based upon the computed magnitude of acceleration of the different vehicle observed by the AV in the forward path of the AV within the region; and
controlling the acceleration of the AV while the AV traverses the region based upon the computed potential tractive force of the driving surface in the region.

8. The AV of claim 7, wherein computing the potential tractive force is further based upon the approximate weight of the different vehicle.

9. The AV of claim 1, the acts further comprising transmitting surface data pertaining to a driving surface in the region of the driving environment to a server computing device, the surface data based upon the computed acceleration and indicative of a measure of traction of the driving surface.

10. The AV of claim 9, wherein the transmitting the surface data is configured to cause the server computing device to transmit updated map data to a second AV, the updated map data including the surface data.

11. The AV of claim 1, the acts further comprising evaluating whether the magnitude of the acceleration of the different vehicle in the region is anomalous relative to an expected acceleration for an object in the region.

12. The AV of claim 1, wherein controlling the acceleration of the AV while the AV traverses the region comprises controlling the AV to decelerate while the AV traverses the region.

13. The AV of claim 1, wherein the acceleration of the AV is further controlled such that a maximum acceleration of the AV while the AV traverses the region is less than or equal to the computed magnitude of the acceleration of the different vehicle observed by the AV in the forward path of the AV within the region.

14. A method executed by an autonomous vehicle (AV), the method comprising:
receiving sensor signals from a plurality of sensor systems mounted on the AV;
generating, based upon the sensor signals, a plurality of position solutions for a different vehicle in the driving environment, the position solutions indicative of positions of the different vehicle over a period of time as the different vehicle traverses a region of the driving environment in a forward path of the AV, the different vehicle being separate from the AV in the driving environment;
computing an acceleration of the different vehicle observed by the AV in the forward path of the AV within the region of the driving environment as the different vehicle traverses the region during the period of time based upon the position solutions;
generating a measure of traction of a driving surface in the region of the driving environment based upon the computed acceleration of the different vehicle observed by the AV in the forward path of the AV within the region, an object type classification of the different vehicle, and an approximate weight of the different vehicle corresponding to the object type classification of the different vehicle; and
controlling at least one of a braking system, a steering system, or a propulsion system of the AV based upon the measure of traction of the driving surface in the region generated based upon the computed acceleration of the different vehicle observed by the AV in the forward path of the AV within the region.

15. The method of claim 14, wherein the measure of traction of the driving surface in the region is one of a coefficient of traction of the driving surface or a potential tractive force of the driving surface with respect to a wheel of the AV.

16. The method of claim 14, wherein at least one of the braking system, the steering system, or the propulsion system of the AV is further controlled based on the acceleration of the different vehicle observed by the AV in the forward path of the AV within the region such that a maximum acceleration of the AV while the AV traverses the region is less than or equal to a magnitude of the acceleration of the different vehicle observed by the AV in the forward path of the AV within the region.

17. The method of claim 14, wherein computing the measure of traction of the driving surface in the region is further based upon labeled data pertaining to the driving surface in the region, and wherein the labeled data is indicative of at least one of a grade of the driving surface in the region or a surface material of the driving surface in the region.

18. A system comprising:
a first autonomous vehicle (AV); and
a server computing device in communication with a fleet of AVs, the first AV included in the fleet of AVs, the server computing device configured to perform the following acts:
updating map data pertaining to an operational region of the fleet of AVs responsive to receiving surface data indicative of a measure of traction of a driving surface in the operational region, wherein the surface data is received from a second AV in the fleet of AVs, wherein the second AV generates the surface data based on an acceleration of a differing vehicle observed by the second AV in the operational region based on sensor signals generated by at least one sensor system of the second AV, and wherein the second AV further generates the surface data based an object type classification of the differing vehicle and an approximate weight of the differing vehicle corresponding to the object type classification of the differing vehicle; and
transmitting the updated map data to the first AV, wherein the updated map data includes the surface data, wherein subsequent to the first AV receiving the updated map data, the first AV controls acceleration of the first AV when the first AV is traveling on the driving surface based upon the surface data, and wherein the acceleration of the first AV is controlled such that a maximum acceleration of the first AV is set based on the measure of traction of the driving surface in an area in which the first AV is traveling.

19. The system of claim 18, wherein the updated map data is indicative of a future time, wherein subsequent to the future time the first AV controls acceleration of the first AV based upon a second measure of traction of the driving surface.

20. The system of claim 18, the measure of traction comprising at least one of an acceleration of a vehicle while the vehicle traversed the driving surface, a coefficient of traction of the driving surface, or a potential tractive force between the driving surface and wheels of the vehicle.

* * * * *